(12) United States Patent
Maeda

(10) Patent No.: US 7,333,730 B2
(45) Date of Patent: Feb. 19, 2008

(54) METHOD AND SYSTEM FOR CONTROLLING STEERING DEVICES USING INFRARED SIGNALS

(75) Inventor: Youichi Maeda, Tokyo (JP)

(73) Assignee: Nikko Co., Ltd., Tokyo (JP)

( * ) Notice: Subject to any disclaimer, the term of this patent is extended or adjusted under 35 U.S.C. 154(b) by 610 days.

(21) Appl. No.: 10/506,440

(22) PCT Filed: Mar. 14, 2002

(86) PCT No.: PCT/JP02/02441

§ 371 (c)(1),
(2), (4) Date: Sep. 2, 2004

(87) PCT Pub. No.: WO03/077591

PCT Pub. Date: Sep. 18, 2003

(65) Prior Publication Data

US 2005/0159077 A1    Jul. 21, 2005

(51) Int. Cl.
*H04B 10/00* (2006.01)

(52) U.S. Cl. .................................................... 398/128
(58) Field of Classification Search ........ 398/118–131, 398/106; 370/444
See application file for complete search history.

(56) References Cited

U.S. PATENT DOCUMENTS 5,737,335 A * 4/1998 Mizuta et al. ............... 370/444
5,903,373 A * 5/1999 Welch et al. ................ 398/128

FOREIGN PATENT DOCUMENTS

| JP | 2-79595 | 3/1990 |
|---|---|---|
| JP | 10-13968 | 1/1998 |

* cited by examiner

*Primary Examiner*—Jason Chan
*Assistant Examiner*—Quan-Zhen Wang
(74) *Attorney, Agent, or Firm*—Young & Thompson

(57) ABSTRACT

A steering method and system controls a plurality of infrared units with a plurality of infrared controllers. The infrared controller sets the time interval between the end of a start signal and the start of a steering signal to match a predetermined time interval specific to each infrared unit being controlled.

2 Claims, 8 Drawing Sheets

METHOD AND SYSTEM FOR CONTROLLING STEERING DEVICES USING INFRARED SIGNALS

FIELD OF INVENTION

The present invention relates to a steering system that uses infrared signals to convey steering information.

BACKGROUND ART

The conventional infrared steering system for steering a plurality of conventional steered cars controls each steered object by transmitting, with time-sharing, steering information and an object identification signal for specifying the steered object from each transmitting means. Furthermore, this transmitting means may identify the other transmitting means used in the vicinity simultaneously and is synchronized with signal transmission timing among reciprocal transmitting means to control separately about four steered cars.

The above-mentioned conventional infrared steering system, however, entails a problem in the limited number of the steered cars capable of travelling simultaneously on account of the prolonged time for transmission of each object identification information and digital steering information.

Thus, an object of the present invention is to provide an infrared steering system and a method thereof for increasing the number of the steered cars capable of travelling simultaneously by reducing a transmission time occupied by each transmission device in transmitting and receiving the steering information as an analog signal free of the object identification signal.

SUMMARY OF THE INVENTION

A steering method and system controls a plurality of infrared units with a plurality of infrared controllers. The infrared controller sets the time interval between the end of a start signal and the start of a steering signal to match a predetermined time interval specific to each infrared unit being controlled.

BEST MODE FOR CARRYING OUT THE INVENTION

Other details, advantages, and characteristics will be apparent from the following embodiments with reference to the accompanying drawings.

Figure 1:
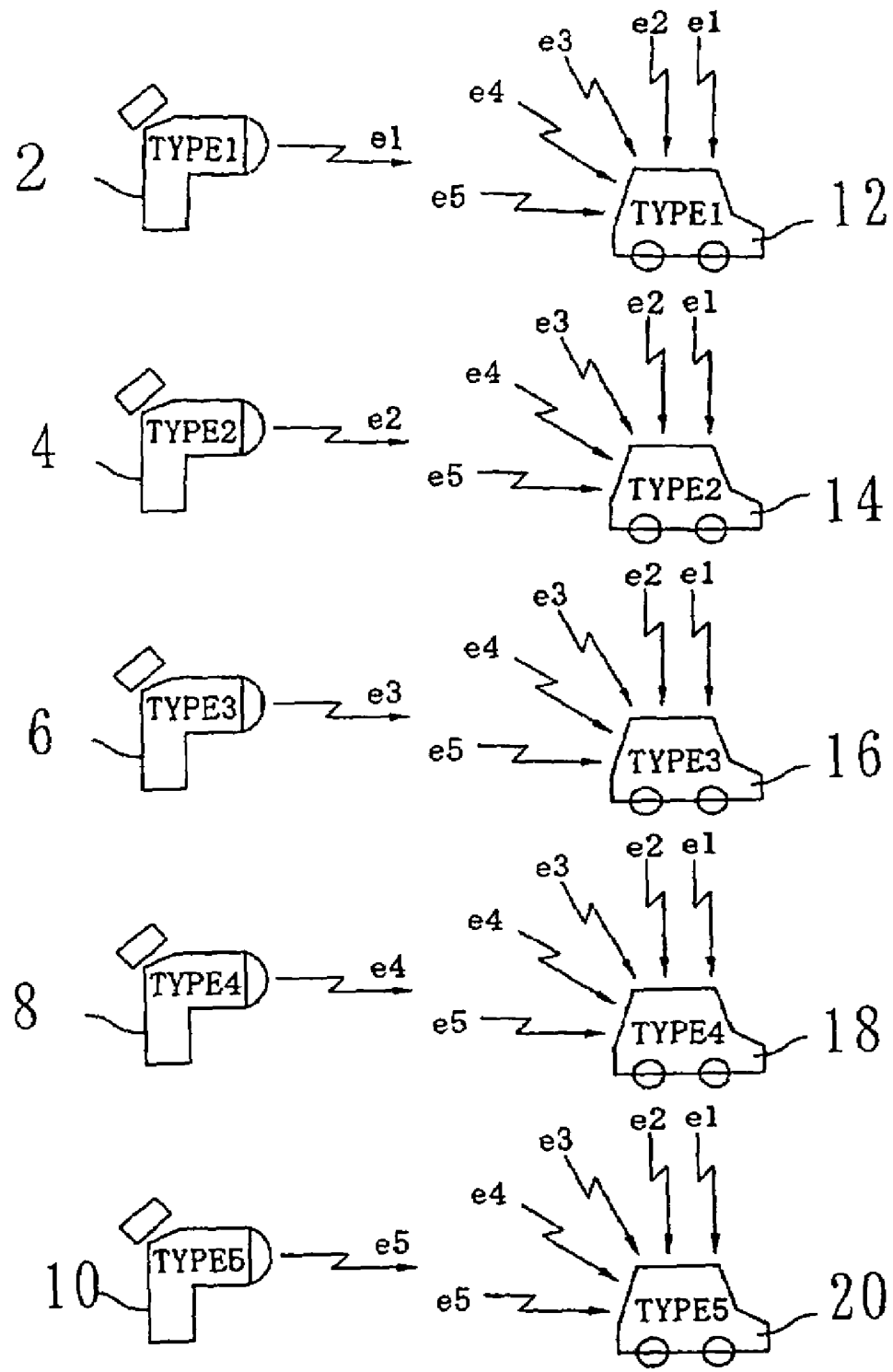
FIG. 1 is a pictorial view showing an embodiment of an infrared steering system according to the present invention.

FIG. 1 shows a constitution of an infrared steering system of an embodiment of the present invention. A plurality of infrared controllers 2, 4, 6, 8, 10 are respectively provided to transmit an infrared carrier wave signal together with steering information. As described later, the five infrared controllers 2, 4, 6, 8, 10, are respectively provided in their internal memory device with identification information for identifying a steered object and are classified into types 1 to 5. Furthermore, the infrared controllers 2, 4, 6, 8, transmit infrared signals that are synchronized among themselves.

The five infrared controlled cars (hereinafter referred to as IR car) 12, 14, 16, 18, 20 (the steered objects of the infrared controllers 2, 4, 6, 8, 10) are each provided with a driving means comprising an infrared controlled device, a motor, wheels, and with an ID for identifying itself. IR cars 12, 14, 16, 18, receive the synchronized infrared signals e1, e2, e3, e4, e5 from the infrared controllers 2, 4, 6, 8, 10 and decode the steering information included in the infrared signals.

Figure 2:
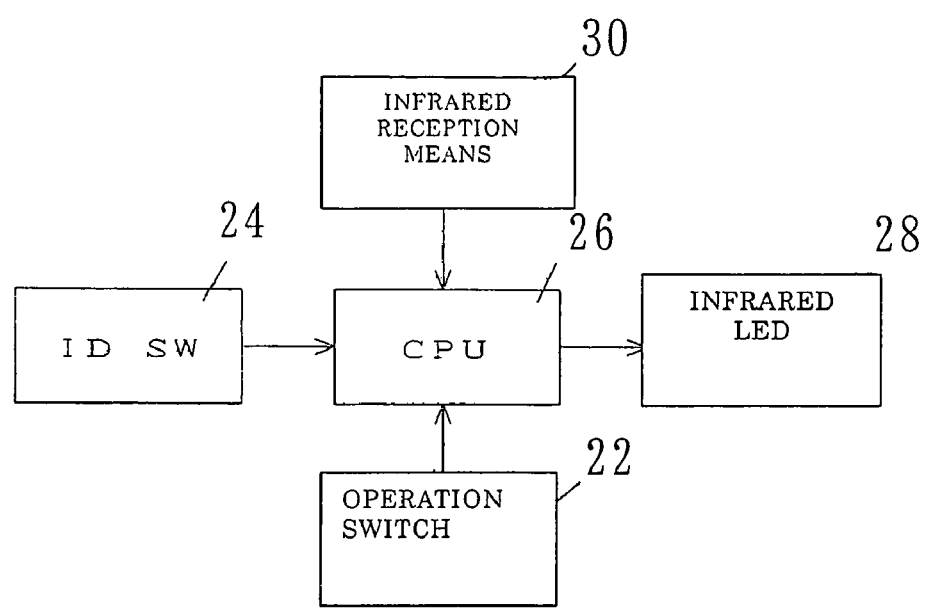
FIG. 2 is a block diagram of a controller of the infrared steering system according to the present invention.

FIG. 2 is a block diagram of the infrared controllers 2, 4, 6, 8, 10 showing an embodiment of the infrared steering system according to the invention, where the infrared controller 2 and the IR car 12 are described as examples.

In the infrared controller 2, an operation switch 22 and an ID switch 24 are electrically connected with a CPU 26 which is in turn electrically connected with an infrared LED 28 and an infrared receiving means 30.

The operation switch 22 is a means of inputting the steering information for steering the IR car 12. The operation switch 22 is provided with control switches including a steering operation switch for controlling travelling direction (not shown) and a driving switch for controlling travelling operation.

The ID switch 24 is constituted of a three bits digital switch, which is a switch for inputting information for specifying eight types of the IR cars by means of three bits 000, 001, 010, ..., 111, and thus is an object setting means for providing object identification information for specifying the steered object. The ID switch 24 is a variable switch capable of being set by a user. The ID switch is not limited to three bits; with more bits, more cars can be steered.

The CPU 26 is constituted of a one chip microcomputer, including a ROM (program memory) and a RAM (work memory) though both are not shown and has a function of storing data into the RAM which is inputted from ports connected to the operation switch 22 and the ID switch 24. The CPU 26 runs a program stored in the ROM and controls the infrared controller 2 in accordance with the program.

The CPU 26 also selects a single transmission mode among five transmission modes corresponding to five of the eight types of ID set by the ID switch 24 and determines a waiting time from a synchronization signal with reference to the object identification information set by the ID switch 24 in accordance with the selected transmission mode to convert the steering information inputted from the operation switch 22 into a modulated signal.

The infrared LED 28 is an LED which receives the modulated signal from the CPU 26 and modulates an infrared carrier wave to emit the infrared signals e1, e2, e3, e4, e5.

The infrared receiving means 30 is a receiving means having a function of monitoring whether the synchronization signal is outputted from the other controllers. When the synchronization signal transmitted from another controller is received, the controller is synchronized with the synchronization signal and outputs a control signal. When the synchronization signal is not received, the synchronization signal is output.

Figure 3:
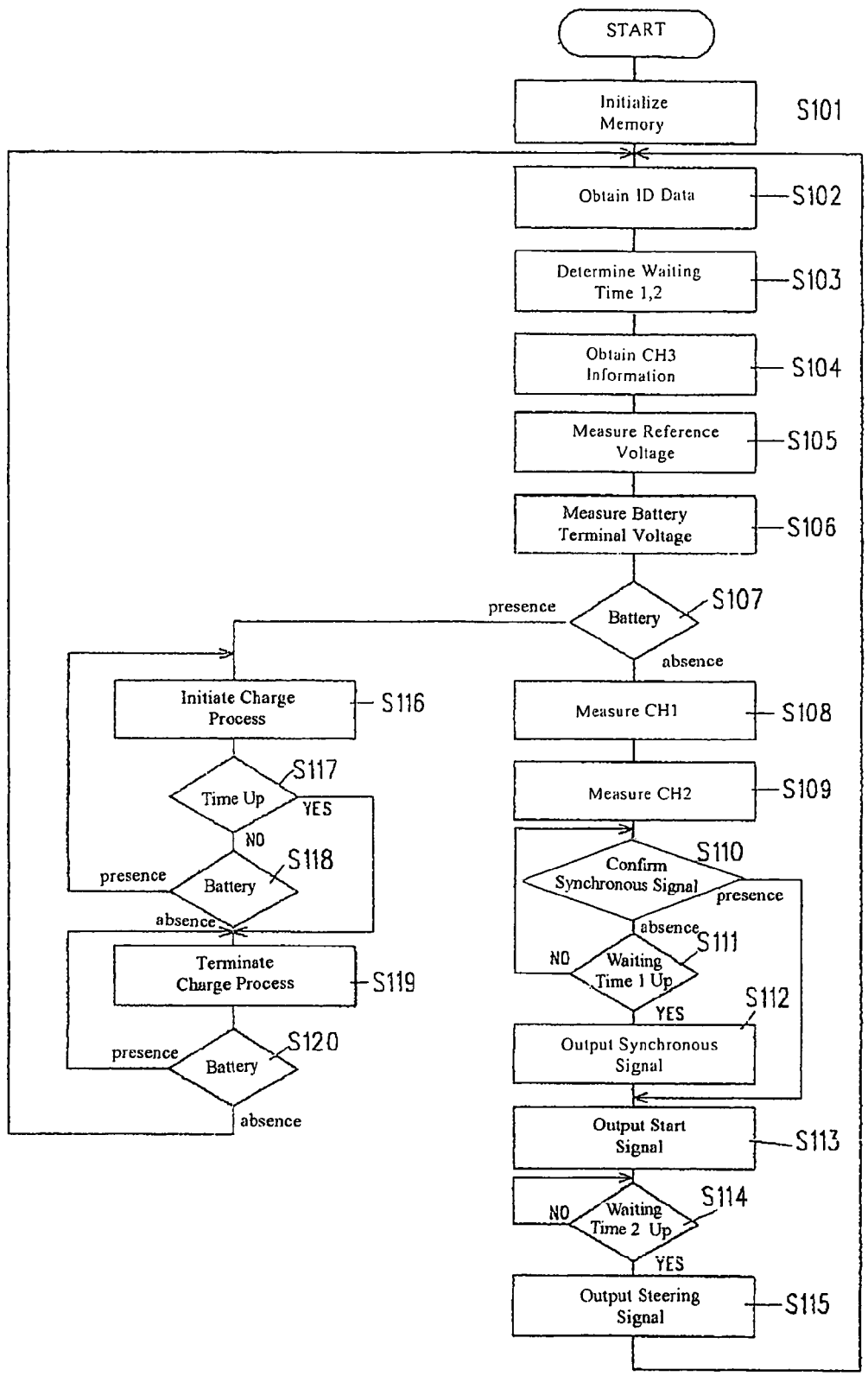
FIG. 3 is a flowchart of the steering controlling process of the infrared steering system according to the present invention.

Operation of the infrared controller 2 shall be described with reference to a flowchart (FIG. 3) run by the CPU 26. In FIG. 3, the CPU 26 first initializes (step S101) the memory (RAM). Then, the CPU obtains port data from a port corresponding to the ID switch 24 (step S102). Next, the CPU 26 calculates and determines (step S103) the first and second waiting times (1), (2) from ID data in a predetermined manner. The two waiting times (1), (2) correspond to a transmission mode for the ID obtained from the ID switch 24 among the five transmission modes for transmitting the steering information after elapse of five different waiting times from the start signal.

Figure 4:
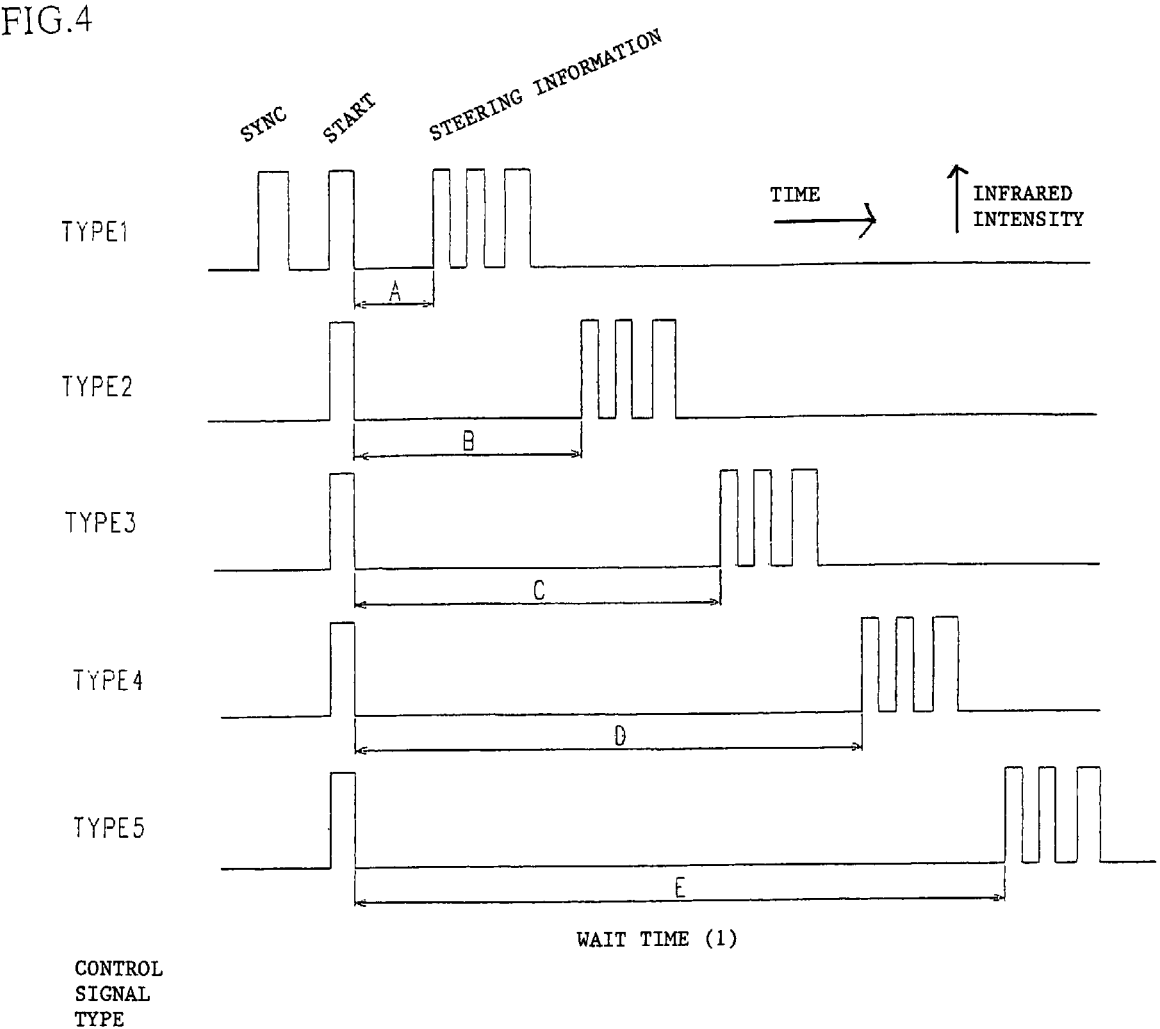
FIG. 4 is a wave form chart showing transmission modes of transmission signals of the infrared steering system according to the present invention.
Figure 5:
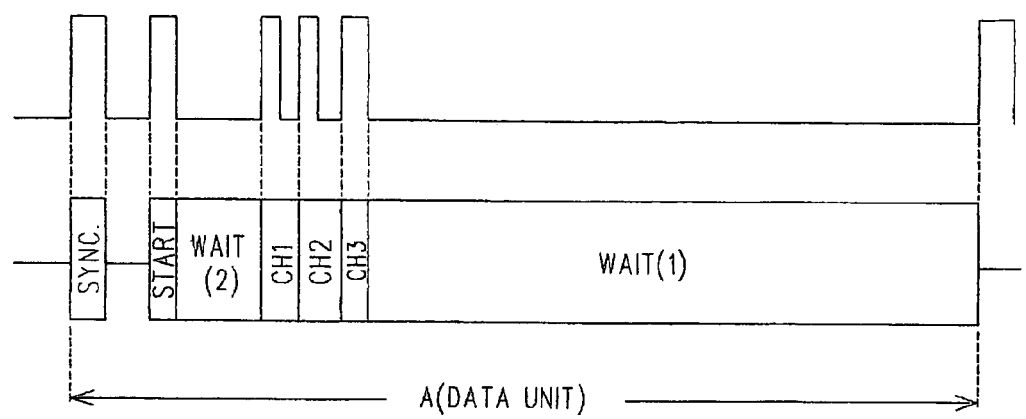
FIG. 5 is a wave form chart of the transmission signal of an infrared steering method according to the present invention.

FIG. 4 shows five transmission modes for transmitting information intermittently within the five different waiting times. FIG. 5 shows the waiting times (1),(2). In the drawing, TYPE 1 detects no synchronization signal but outputs the synchronization signal and a start signal, then outputs the steering information signal after the second waiting time A, and repeats the process and outputs another synchronization signal after an interval of the first waiting time. Each of TYPE 2 to TYPE 5 receives the synchronization signal, synchronizes and outputs the start signal to output each steering information signal after the each respective second waiting time B-E.

FIG. 5 shows a timing chart of a data unit of period A in a TYPE 1 car, where sync is a period for synchronizing with the other controllers. Next, START is start data indicating the beginning of data. Each TYPE is distinguished depending on difference in the next period of WAIT (2). Then, the steering information is inputted and the time length of CH1, CH2, CH3 varies depending on electric potential of a control volume. The data unit is repeated after a period of WAIT (1).

In FIG. 3, the CPU obtains the steering information and information from the operation switch 22 (step S104, S108, S109) and determines the steering information.

The infrared controller 2 has a charging function and performs measurement (step S105) of the reference voltage and measurement (step S105) of the battery terminal voltage. And then, the CPU determines (step S107) presence/absence of a battery and the charging is initiated (step S116) when the battery is connected. After that, the CPU determines whether or not two-minute charge time is terminated (step S117) and whether the battery is removed from the infrared controller 2 (step S118). The CPU performs the charge termination process (step S119) and finally reconfirms the presence or absence of the battery (step S120) and returns to the condition of obtaining the ID data (step S102).

When the battery for charge is not connected to the infrared controller 2, the transmission mode takes place, and then the CPU obtains the information of presence/absence of synchronization signal from the infrared receiving means 30 (step 510). When the synchronization signal is not detected during the waiting time (1) determined at ID setting (step S111), the synchronization signal is outputted automatically (step S112) in the order of start signal, waiting time (2) and steering signal (step S113, S114, S115).

A mechanism of an IR car 12 has two models. Model A controls travelling directions and travelling forward and backward by driving right wheels (WHEEL) and left wheels independently and model B controls the travelling directions and the travelling forward and backward by steering drive and travelling drive forward and backward. Either models are provided with two motors. Model A is constituted of a RIGHT motor for the right wheel drive and a LEFT motor for left wheel drive. Model B is constituted of a STEERING motor for a steering mechanism drive and a WHEEL motor for wheel drive.

Figure 6:
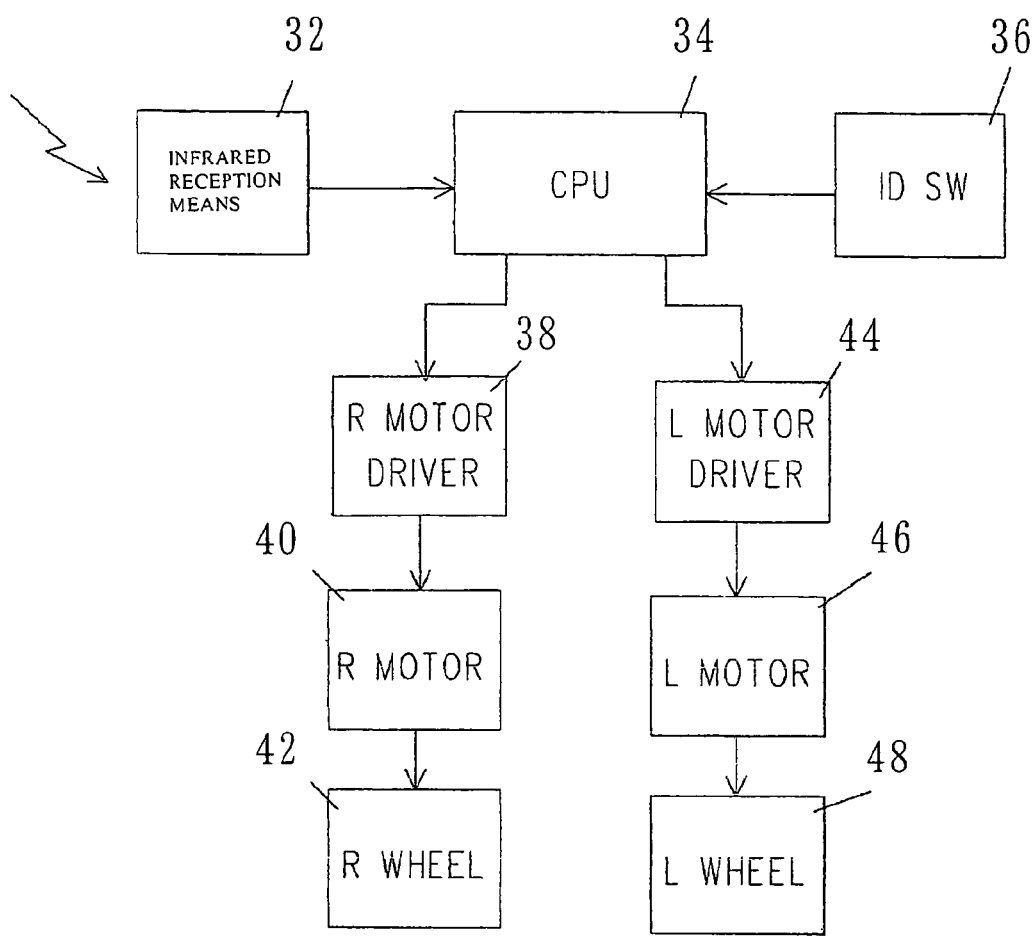
FIG. 6 is a block diagram of a first embodiment of the steered object according to the present invention.

FIG. 6 is a block diagram showing an arrangement of a reception unit of the infrared steering system of the IR car 12 of model A.

In the reception unit of the infrared steering system of the IR car 12, the infrared receiving means 32 and CPU 34 are electrically connected. Moreover, the CPU 34 and an ID switch 36 are electrically connected. Furthermore, the CPU 34 is electrically connected to an R motor driver 38 which is an right motor drive unit. The R motor driver 38 is electrically connected to an R motor 40 which is mechanically connected to an R wheel 42. In left motor, similarly, the CPU 34 is electrically connected to an L motor driver 44 which is left motor driver unit. The L motor driver 44 is electrically connected to an L motor 46 which is mechanically connected to an L wheel 48.

The infrared receiving means 32 receives an infrared signal transmitted from the infrared controller 2 to convert the infrared signal into an electric signal.

The CPU 34 is constituted of one chip microcomputer including a ROM (program memory) and a RAM (work memory) which are not shown. The CPU 34 extracts the steering information obtained from the infrared receiving means 32 from a self-identification information and decodes the steering information produced by the infrared controller 2 to store in the RAM. Then, the program stored in the ROM is retrieved so that IR car 12 is controlled.

The ID switch 36 is constituted of a 3 bit digital switch. The 3 bit digital switch is a switch capable of setting eight numerical values consisting of 000, 001, 010, . . . 111. Each value corresponds to the eight types identified, the IR car 12 identifies itself from the setting and the switch 36 constitutes a self setting means for providing the self-identification information. The ID switch 36 is previously set during the manufacturing step and may be conveniently identified with a sticker and the like.

The CPU 34 after receiving the start signal extracts the steering signal following the waiting time (2) in accordance with the self-identification information set by the ID switch 36 to convert the steering information into a driving signal. Thus, the CPU 34 extracts the steering information after the waiting time (2) set by the self-setting ID switch 36 from the start signal received in the infrared receiving means 32 and constitutes a signal converting means for converting into the driving signal.

The R (RIGHT) motor driver 38 converts an R motor data from the CPU 34 into the driving signal and supplies to the R motor 40 to drive the right wheel mechanism 42 (RWHEEL).

Also, the L motor driver 44 (LEFT) converts an L motor data from the CPU 34 into the driving signal and supplies to the L motor 46 to drive the left wheel mechanism 48.

Figure 7:
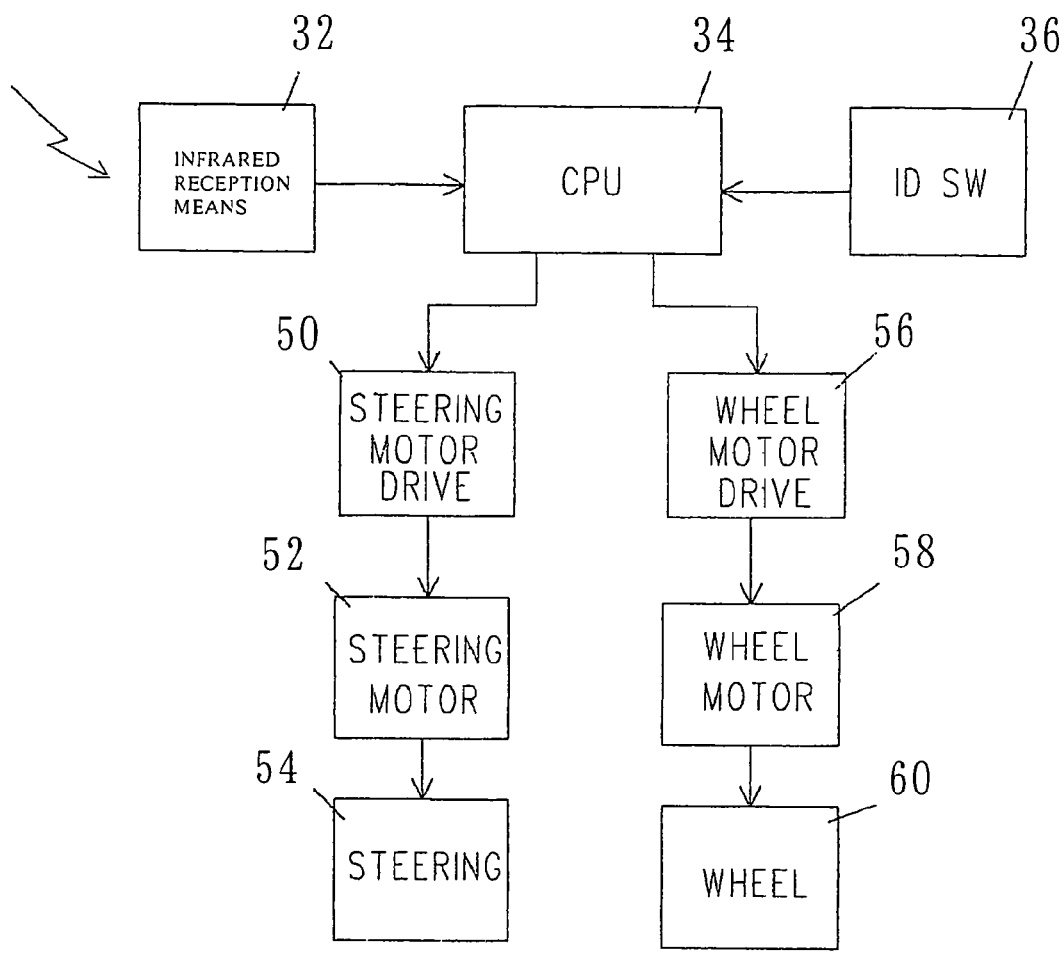
FIG. 7 is a block diagram of a second embodiment of the steered object according to the present invention.

FIG. 7 is a block diagram showing constitution of a system of the IR car 12 of the model B. In the drawing, units having the same constitution as the IR car 12 of the model A in FIG. 6 are shown by the same reference and description overlapping with the description in FIG. 6 is omitted. In FIG. 7, a steering motor driver 50 converts an S (STEERING) motor data from the CPU 34 into the driving signal and supplies to an S motor 52 to drive a steering (STEERING) mechanism 54.

Figure 8:
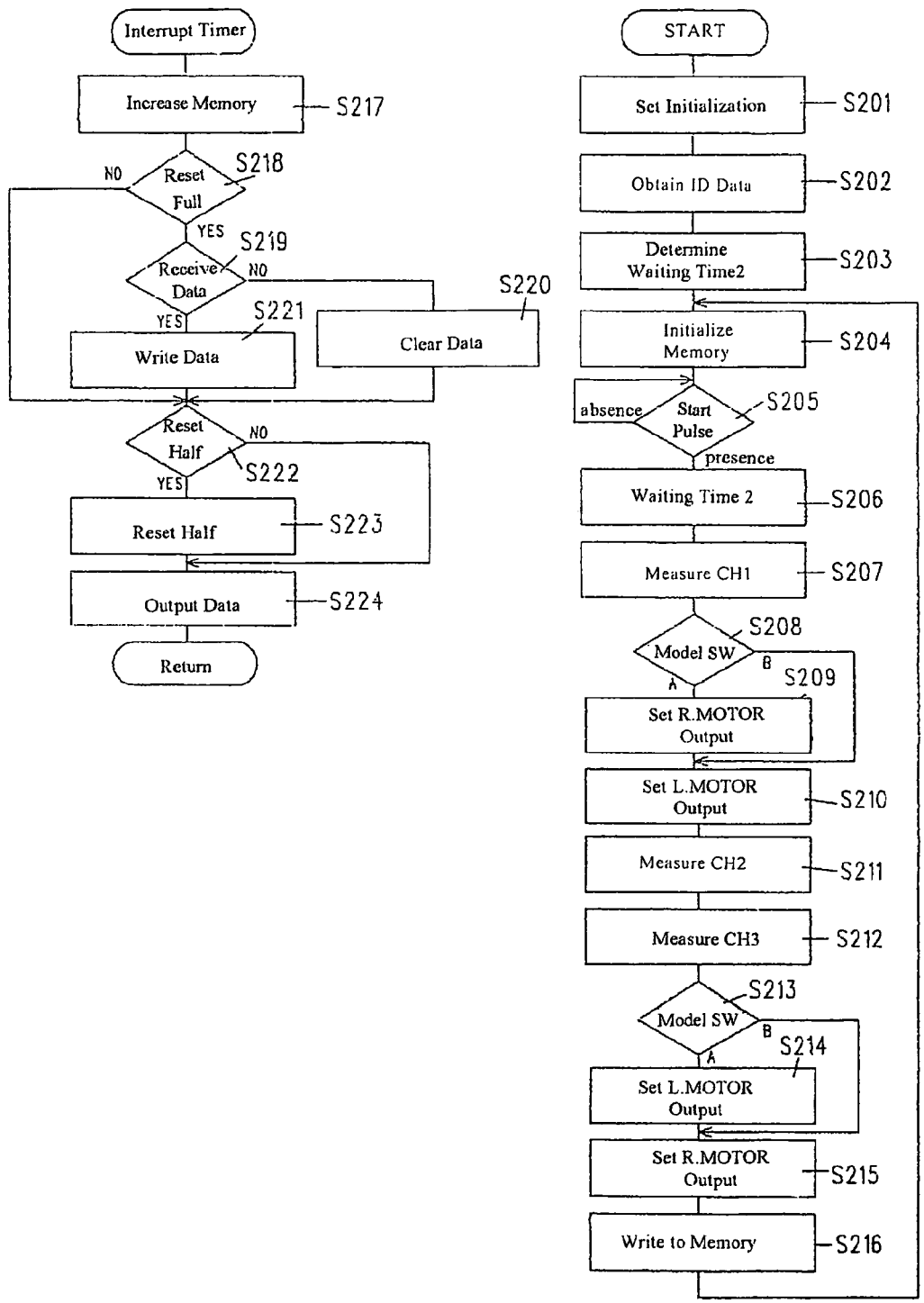
FIG. 8 is a flowchart of the steering controlling process of the second embodiment of the infrared steering method according to the present invention.

Also, a W (WHEEL) motor driver 56 converts a W motor data from the CPU 34 into the driving signal and supplies to a W motor 58 to drive both wheel (WHEEL) mechanisms 60. Next, operations of the IR car 12 of the model A and the model B shall be described with reference to a flowchart which is run by the CPU 26. In FIG. 8, the CPU initially performs initialization of a port and the like (step S201), and runs the following loop process. The CPU 26 obtains the ID data from an input port to determine the waiting time (1), (2) (step S202, S203). Then, the CPU 26 performs initialization of memory (RAM) (step S205) and checks the start data of the received infrared signal (step S204). Or the CPU 26 detects the start data which indicates the beginning of the data in a timing chart shown in FIG. 5. When the CPU 26 detects no start pulse (absence), the CPU 26 continues check of the start data of step S205. When detecting the start pulse (presence), the CPU 26 performs measurement of CH1 data (step S206, S207) after the waiting time (2) determined by the ID data after the start pulse.

After obtaining the CH1 data, the CPU 26 discriminates the model (step S208) so that whether its own model is the model A or the model B may be discriminated. The discrimination is performed by a model SW. In case of the model A, output setting of the R motor 40 is performed (step S209), and the output setting of the L motor 46 is performed (step S210). Meanwhile, in case of the model B, the only output setting of the L motor 46 is performed (step S210).

Next, similarly to the CH1, the CPU 26 performs the discrimination of the model after obtaining the CH2 data and the CH3 data (step S211, S212). In case of own model A, the output setting of L motor and R motor takes place (step S214, S215). While, in case of the model B, only setting of the R motor 40 takes place (step S215).

The data is stored in memory (RAM) after each output setting (step S216).

After the output setting, the CPU 26 returns to the step S204 to check the start pulse. An output control is performed by the timer interruption. The CPU 26 discriminates whether or not values of timer resistors TF, TH of the RAM have reached values of T1, T2 set previously. The values of the timer resistors TF, TH are increased at every timer interruption (step S217). When the value of the TF reaches T1, the CPU 26 clears the output data (step S220) or retrieves the data (step S221) in response to presence or absence of a reception data (step S218, S219).

Next, when the value of the TH reaches the value of the T2 (step S222), the CPU 26 once updates the output (half reset, step S223). Finally, the output data is outputted to a corresponding motor driver (step S224). After that, the timer interruption is terminated to return to the main routine.

Thus, in the embodiment, the infrared controller 2 is constituted of a inputting means for receiving the steering information, an infrared receiving means for detecting an infrared radio signal from another controller, an object setting means for providing object identification information for specifying a steering object, a mode selecting means for selecting one of the transmission modes in response to the object identification information, a signal converting means for converting a synchronization signal, a start signal, and a steering information into a modulated signal, and a transmitting means for transmitting the infrared radio signal to which an infrared carrier wave signal is modulated by the modulated signal.

Also, the IR car 12 is constituted of a self setting means for providing a self-identification information, a means for receiving the infrared signal from the infrared controller 2, a means for extracting the steering information which is included in the infrared signal received by the receiving means, a signal converting means for converting the extracted steering information into the driving signal, and a drive controlling means for operating a driving means in response to the driving signal.

According to the embodiment, a plurality of steered objects are extracted in response to the time from the start signal free of the identification signal by synchronizing among the controllers and different infrared radio signals are made depending on difference in time from the start signal. Thus, the identification information becomes unnecessary for each radio signal. Transmission time may be abbreviated, so that more objects may be steered.

Furthermore, in the embodiment, the switch 36 for setting the ID at the side of the IR car 12 is provided previously set at the manufacturing operation, notwithstanding the switch 36 may be arranged by user's free operation. Namely, in the IR car 12, the object identification information and the self-identification information are set in response to operation. Thus, users may set ID at the best conditions. For example, when common ID systems exist, ID setting may be changed in order to perform the steering simultaneously.

In the embodiment, the infrared ray is used as a radio signal carrying the steering information. VHF band and other electromagnetic wave may be used for the carrier wave.

The invention claimed is:

1. An infrared steering method for controlling a plurality of infrared controlled devices with a plurality of infrared controlling devices, the method comprising the steps of:
    identifying each of the plurality of controlled devices by setting therein a respective first wait time between receipt of an end of a steering information signal and receipt of a beginning of an immediately following synchronization signal, and a respective second wait time between receipt of an end of a start signal and receipt of beginning of the steering information signal, a length of the second wait time identifying the respective controlled device;
    in each of the plurality of controlling devices, identifying a respective one of the plurality of controlled devices to which an infrared signal is to be directed by setting a time delay between an end of transmission of the start signal and beginning of transmission of the steering information signal, a length of the time delay corresponding to the second wait time set in the respective controlled device and identifying the respective controlled device to which the infrared signal is to be directed;
    in each of the controlling devices, when the synchronization signal is not received in the first time period, transmitting the infrared signal with, in order, the synchronization signal, the start signal, the time delay, and the steering information signal, from the respective controlling device to the plurality of controlled devices, and when the synchronization signal is received in the first time period, transmitting the infrared signal without the synchronization signal but with, in order, the start signal, the time delay, and the steering information signal, from the respective controlling device to the plurality of controlled devices;

in each of the plurality of controlled devices, receiving the transmitted infrared signal and determining whether the received infrared signal is directed to the respective controlled device by measuring the time delay, wherein the received infrared signal is directed to the respective controlled device when the measured time delay corresponds to the second wait time set therein.

2. An infrared steering system for controlling a plurality of infrared controlled devices with a plurality of infrared controlling devices, the system comprising:

a plurality of controlled devices, wherein each of the plurality of controlled devices is identified by having set therein a respective first wait time between receipt of an end of a steering information signal and receipt of a beginning of an immediately following synchronization signal, and a respective second wait time between receipt of an end of a start signal and receipt of beginning of the steering information signal, a length of the second wait time identifying the respective controlled device;

a plurality of controlling devices, wherein each of the plurality of controlling devices identifies a respective one of the plurality of controlled devices to which an infrared signal is to be directed by having set therein a time delay between an end of transmission of the start signal and beginning of transmission of the steering information signal, a length of the time delay corresponding to the second wait time set in the respective controlled device and identifying the respective controlled device to which the infrared signal is to be directed;

each of the controlling devices being arranged so that when the synchronization signal is not received in the first time period, transmitting the infrared signal with, in order, the synchronization signal, the start signal, the time delay, and the steering information signal, from the respective controlling device to the plurality of controlled devices, and when the synchronization signal is received in the first time period, transmitting the infrared signal without the synchronization signal but with, in order, the start signal, the time delay, and the steering information signal, from the respective controlling device to the plurality of controlled devices;

each of the plurality of controlled devices being arranged to receive the transmitted infrared signal and determine whether the received infrared signal is directed to the respective controlled device by measuring the time delay, wherein the received infrared signal is directed to the respective controlled device when the measured time delay corresponds to the second wait time set therein.

* * * * *